May 11, 1926.
G. DEETER
EXHAUST STOVE FOR AUTOMOBILES
Filed May 20, 1925
1,584,514
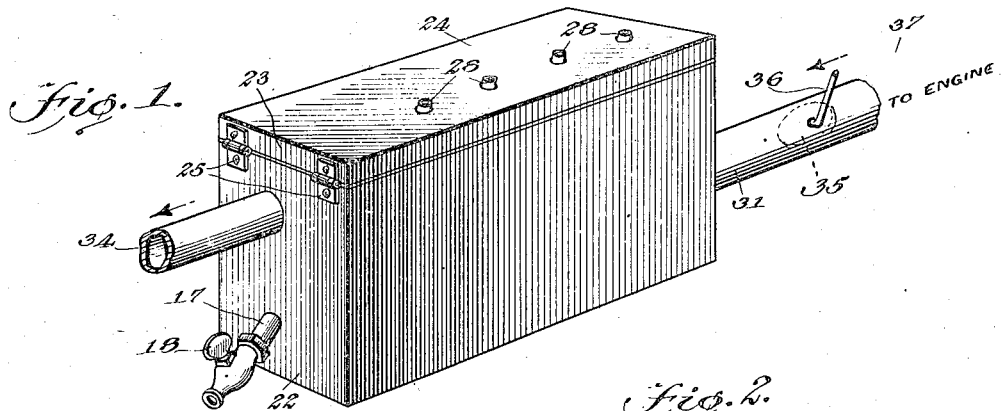
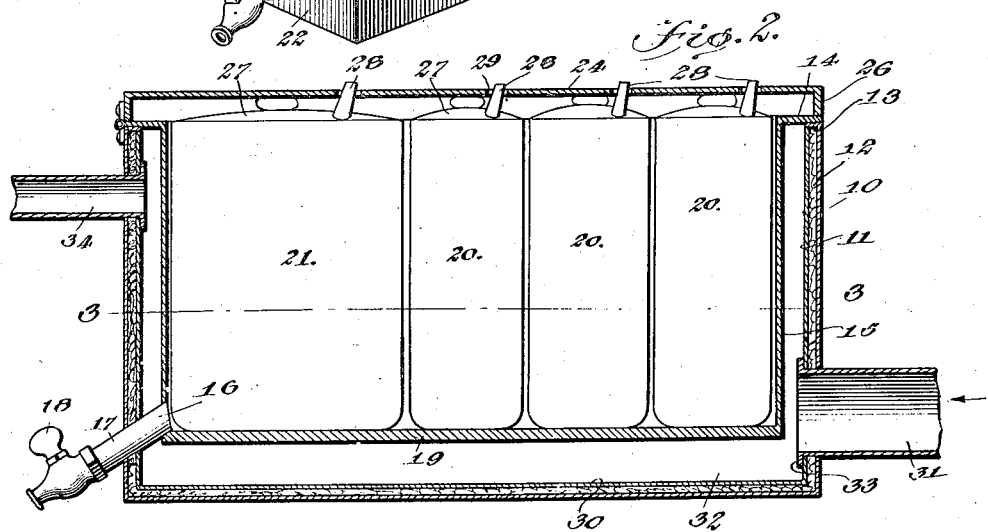
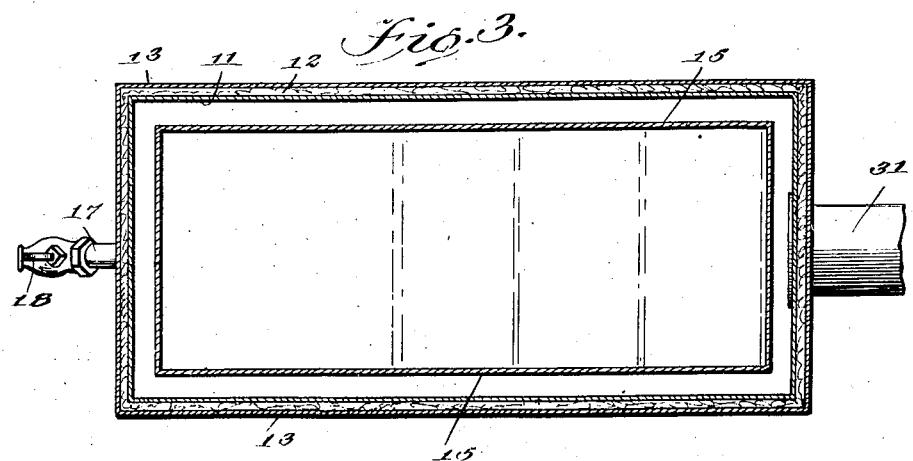
WITNESSES
INVENTOR
George Deeter,
BY
ATTORNEYS Patented May 11, 1926.

1,584,514

UNITED STATES PATENT OFFICE.

GEORGE DEETER, OF BURBANK, CALIFORNIA.

EXHAUST STOVE FOR AUTOMOBILES.

Application filed May 20, 1925. Serial No. 31,573.

This invention relates to a cooker adapted to be connected to the exhaust pipe of an engine of an automobile.

An object of the invention is the provision of a stove adapted to be connected directly with the exhaust manifold of the engine or by means of a by-pass in said manifold so that a heating chamber is formed around a casing which is adapted to be used for frying or broiling meats and which also may be used to receive a plurality of cooking vessels for steaming or boiling foods.

A further object of the invention is the provision of an outer casing insulated from the atmosphere and provided with an inner casing spaced from the walls of the outer casing to form a heating chamber, the heating chamber being connected with a by-pass connected to the exhaust pipe, the heating chamber being so disposed relative to the inner casing and so insulated that articles of food may be readily cooked either directly in the inner casing or in vessels placed in juxtaposition with their tops protected from the atmosphere by a cover extending the full length of the outer insulated casing.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a view in perspective of the stove ready for connection with the exhaust pipe of an internal combustion engine.

Figure 2 is a vertical longitudinal section of the same.

Figure 3 is a horizontal section taken along the line 3—3 of Figure 2.

Referring more particularly to the drawings, 10 and 11 designate outer casings spaced from each other in order to receive a packing of asbestos 12. The upper edges as shown at 13 of the outer casings are connected together and upon said edges is adapted to rest a flange 14 projecting laterally from the side and end walls of an inner casing 15. At the lower end and along one end edge of the inner casing is provided an opening into which is received an end 16 of a discharge conduit 17 which is controlled by a valve 18 for permitting the release of lard which has been placed upon the bottom or frying pan portion 19 of the inner casing 15. The pipe 17 is also employed for permitting the discharge of water from the casing 15 which has drained over from any one of a plurality of cooking pots 20 or 21 and also for releasing wash water that has been used for cleansing the interior of said inner casing. The plate 19 which forms the bottom of the inner casing 15 has a greater thickness than the side walls in view of the fact that said plate is used at certain times for directly frying or broiling articles of food.

At one end 22 of the outer casing an end 23 of the cover 24 is hingedly connected as shown at 25, the cover being coextensive with the outer casing 10 so that when the cover is in position the inner casing 15 is substantially sealed from the atmosphere and the flanged portions 26 of the cover 24 rest upon the outer edges of the flange 14 of the inner casing 15.

Each of the cooking vessels 20 or 21 is provided with a removable cover 27 which has a tube 28 passing through a perforation 29 in the cover 24 and projecting beyond said cover so that the steam which is formed within the cooking vessels will be permitted to escape to the atmosphere.

The side walls of the inner casing 15 are spaced from the side walls of the outer casing 11 and the plate 19 is spaced from the bottom 30 of the outer casing 11 a greater distance than the distance between the side walls of the inner casing and the side walls of the casing 11 in order to form a heating chamber through which the exhaust gases from an internal combustion engine are adapted to circulate. A pipe 31 forms a by-pass for connecting the heating chamber 32 with the exhaust pipe and said conduit passes through perforations in the outer casings 10 and 11 and is provided with a flange 33 at its inner end for aiding in maintaining the pipe 31 in position. A discharge pipe 34 is connected with the opposite end wall of the outer casings 10 and 11 and permits the exhaust gases from the heating chamber 30 to escape to the atmosphere.

It will be noted that the discharge pipe 34 is disposed adjacent the upper end of the heating chamber while the intake 31 is located at the lower end with the intake pipe 31 having a larger diameter than the discharge pipe 34 so that the exhaust gases will tend to crowd and maintain a slight pressure within the chamber 32 for aiding in not only maintaining a constant temperature in the heating chamber but for maintaining a greater temperature than will ordinarily be had without such pressure.

A valve 35 is mounted in the intake pipe 31 and is controlled through a lever 36 and a link 37. This link may be extended to a point on the dash for opening and closing said valve so that the exhaust gases may be admitted to the heating chamber whenever desired.

What I claim is:

In combination with the exhaust pipe of an engine, a cooker comprising a pair of open outer casings, an insulating packing located between the outer casings, an inner casing having a flange at its upper open end projecting laterally therefrom and resting upon the upper edges of the pair of outer casings, the inner casing having less dimensions than the outer casings whereby the side walls and bottom of the inner casing are spaced from the respective side walls and bottoms of the outer casings to form a heating chamber between said inner and outer casings, a cover coextensive with an outer casing hingedly connected with said casing and provided with a peripheral flange adapted to rest upon the flange of the inner casing, a conduit adapted to connect the heating chamber with the exhaust pipe, and a discharge conduit connected with the opposite end of the heating chamber, a valve in the intake conduit for controlling the flow of hot gases to the heating chamber, a plurality of cooking pots located within the inner casing and provided with exhaust steam pipes, the cover being provided with perforations, the outer free ends of the steam pipes projecting through the perforations in the cover and a drain pipe conected with the inner casing and extending through and beyond the outer casings and cooperating to hold the inner casing in position in the outer casings.

GEORGE DEETER.